US005127159A

United States Patent [19]

Kudo et al.

[11] Patent Number: 5,127,159

[45] Date of Patent: Jul. 7, 1992

[54] METHOD AND APPARATUS FOR INSERTING TERMINAL-CARRYING WIRE ENDS INTO A CONNECTOR HOUSING

[75] Inventors: Shigeji Kudo; Sanae Suzuki; Hideaki Morita; Hiroo Suzuki, all of Shizuoka, Japan

[73] Assignee: Yazaki Corporation, Tokyo, Japan

[21] Appl. No.: 684,457

[22] Filed: Apr. 12, 1991

Related U.S. Application Data

[63] Continuation of Ser. No. 363,831, Jun. 9, 1989, abandoned.

[30] Foreign Application Priority Data

Jun. 13, 1988 [JP] Japan ............................... 63-143555

Jun. 13, 1988 [JP] Japan ............................... 63-143559

[51] Int. Cl.$^5$ ........................ H01R 43/04; B23P 23/00

[52] U.S. Cl. ...................................... 29/863; 29/564.4; 29/753; 29/754; 29/861

[58] Field of Search ................. 29/845, 863, 866, 861, 29/564.4, 753, 754

[56] References Cited

U.S. PATENT DOCUMENTS

| | | | |
|---|---|---|---|
| 3,964,147 | 6/1976 | Fusco et al. | 29/754 X |
| 4,074,424 | 2/1978 | Deshich et al. | 29/754 X |
| 4,087,908 | 5/1978 | Fusco et al. | 29/564.4 X |
| 4,139,937 | 2/1979 | L'Homme | 29/754 |
| 4,164,065 | 8/1979 | Funcik et al. | 29/754 X |
| 4,214,361 | 7/1980 | Coldren et al. | 29/863 |
| 4,247,980 | 2/1981 | Tominoi | 29/564.4 X |
| 4,383,364 | 5/1983 | Casey | 29/861 X |
| 4,411,484 | 10/1983 | Casey | 29/866 X |
| 4,581,796 | 4/1986 | Fukuda et al. | 29/564.4 X |
| 4,831,727 | 5/1989 | Johnson, Jr. et al. | 29/866 |

*Primary Examiner*—Carl J. Arbes

*Attorney, Agent, or Firm*—Armstrong, Nikaido, Marmelstein, Kubovcik & Murray

[57] ABSTRACT

Described herein is a method and an apparatus which permit terminal-carrying ends of wire units to be automatically inserted into a connector housing in a reliable manner almost irrespective of the type and size of the terminal elements to be inserted. This is attained by providing a transfer plate which is movable to a position confronting a selected one of a plurality of connector housings set on an assembling table. An assembling head is mounted on the transfer plate movably in vertical directions and also in directions toward and away from the transfer plate. A wire-embracing terminal portion and a wire portion of the wire unit are gripped by means of openable and closable paired terminal gripping pawls and wire gripping pawls which are vertically movably supported on the assembling head. The posture of the terminal element is adjusted by lowering a terminal presser plate which is vertically movably provided between the paired terminal gripping pawls. The assembling head is moved toward the connector housing to insert the terminal element into the connector housing. The terminal gripping pawls are opened and lifted up as soon as an electric contact portion of the terminal element is inserted into a terminal compartment of the connector housing.

14 Claims, 17 Drawing Sheets

METHOD AND APPARATUS FOR INSERTING TERMINAL-CARRYING WIRE ENDS INTO A CONNECTOR HOUSING

This application is a continuation division of application Ser. No. 363,831 filed Jun. 9, 1989, now abandoned.

BACKGROUND OF THE INVENTION

1. Field of the Invention

This invention relates to a method and an automated apparatus for inserting wire ends having terminal elements into a connector housing.

2. Description of the Prior Art

For automatically inserting a terminal-carrying wire end into a connector housing, there has been known in the art a method of providing a terminal insert guide, of a trumpet-like shape, opposing a terminal compartment in the connector housing. The terminal element on the wire end is inserted through the guide by means of a terminal gripping jig of a shape conforming with that of the terminal element.

However, in order to cope with the diversity in shapes of different terminal elements, it has thus far been necessary to provide various types of guides and gripping jigs corresponding to the shapes of the individual terminal elements. A machine must therefore be provided which is large in size and complicated in construction, resulting in an increased number of operational steps and a longer production tact.

Especially for a connector housing with a large number of holes which involves insertion of various types of terminal elements, it has been the general practice to rely on manual labor due to the difficulty of an automated operation by a machine, in spite of insertion errors such as wiring errors and incomplete insertions which are serious problems in the connector assembling process.

SUMMARY OF THE INVENTION

With a view to solving the above-mentioned problems, the present inventors have conducted extensive studies in this connection and succeeded in achieving the present invention based on a finding that the terminal elements, which consist of an electric contact portion to be engaged with a mating terminal element and a pressed neck portion embracing a wire portion, do not have large differences in dimensions of the pressed neck portions irrespective of conspicuous differences in shape and size.

Namely, it is an object of the present invention to provide a method and an apparatus for automatically inserting terminal-carrying wire ends into a connector housing, which can be applied to terminal elements of various types without necessitating auxiliary jigs or equipment such as terminal guides.

It is another object of the present invention to provide a method and apparatus for automatically inserting a terminal-carrying wire ends into a connector housing, with a checking device for checking incompletely inserted terminal elements to preclude occurrences of defective products.

In accordance with an aspect of the present invention, for achieving the above-mentioned objects, there is provided a method for automatically inserting a pressed-on terminal element at an end of a wire unit into a connector housing. The method comprises first providing a transfer plate which is movable to a position confronting a selected one of connector housings set on an assembling table. An assembling head is mounted on the transfer plate movably in vertical directions and also in directions toward and away from the transfer plate. A pressed wire-embracing terminal portion and a wire portion, are gripped by a pair of terminal gripping pawls and a pair of wire gripping pawls, respectively which are mounted on the assembling head. The posture of the terminal element is rectified by lowering a terminal presser which is provided vertically movably between the paired terminal gripping pawls. The assembling head is moved toward the connector housing to insert the terminal element thereinto. The terminal gripping pawls are opened and lifted up as soon as an electric contact portion of the terminal element is inserted in a terminal compartment in the connector housing.

When putting the above-described method into practice, it is preferably arranged such that the pressed terminal portion is gripped by the terminal gripping pawls at a neck portion embracing the conductor of the wire. This is because there are less differences in dimensions particularly in the outer diameter of the conductor-embracing neck portions between terminal elements of different types which differ from each other in shape and size.

In order to insert the terminal-carrying wire end smoothly into a terminal compartment, it is preferred to provide a) a vertically movable terminal presser plate between the paired terminal gripping pawls for rectifying the posture of the terminal element gripped by the pawls in the horizontal direction, in combination with b) a centering mechanism which aligns the terminal element with the axial center line of the terminal compartment.

The foregoing description explains the method of the invention when inserting the terminal-carrying ends of wires into a plural number of terminal compartments in a single connector housing. However, the terminal-carrying wire ends can be inserted automatically into selected terminal compartments in a plural number of connector housings by arranging the transfer plate to move parallel to a plural number of connector housings which are set in side-by-side positions on an assembling table and in face-to-face relation with the terminal-carrying ends of a plural number of wires which are arrayed at predetermined intervals in a parallel relation with the connector housings.

In order to preclude incomplete insertion of the terminal element, it is also preferred to provide wire clamp plates on the assembling head along with the terminal and wire gripping pawls. The wire clamp plates are moved away from the connector housing after inserting and anchoring a terminal element in a terminal compartment. Tension is thus applied to the wire to check if the terminal has been securely anchored in the terminal compartment.

In order to move the wire clamp plates away from a connector housing in the present invention, it is possible to retract the assembling head relative to the transfer plate or to swingably mount the assembling head about a support shaft on a head holder to permit its back swing (a backward rocking motion about the support shaft).

According to the present invention, there is also provided an apparatus for carrying out the above-described method. The apparatus includes openable and closable paired terminal gripping pawls and wire gripping pawls mounted vertically movably on lower end portions of an assembling head. A terminal presser plate is vertically movably provided between the paired terminal gripping pawls. A transfer plate is movable in a direction parallel to an assembling table holding a plural number of connector housings thereon. A head holder supports the assembling head and is mounted on the transfer plate movably in vertical directions and also in directions toward and away from the transfer plate. The terminal elements can be inserted more smoothly by using a centering sensor in combination with the terminal presser plate mentioned hereinbefore.

Preferably, the assembling head is provided with openable and closable wire clamp plates in a position behind the wire gripping pawls.

According to the present invention, for inserting the terminal-carrying wire ends into a connector housing, the terminal gripping pawls hold a pressed terminal portion, preferably a conductor-embracing neck portion of each terminal element, so that the terminal gripping pawls can be universally applied to terminal elements of various types. Rectification of the posture and centering of the terminal elements are effected prior to insertion into a connector housing by the terminal presser plate. The sensor ensures smooth insertion of the terminal elements. Accordingly, the invention obviates the conventional terminal guides and makes it possible to use the same apparatus for insertion of a diversity of terminal elements and to check the conditions of the inserted terminal elements during the assembling operation.

According to the invention, it is possible to insert a selected one or selected ones of terminal-carrying wire ends into a selected one or selected ones of connector housings or terminal compartments. Therefore, as will be described in greater detail hereinafter, the terminal-carrying wires can be assembled into a form of a wire harness at the end of an encasing stage (FIGS. 13 and 14). The automatic insertion of terminal elements is effective for preventing insertion errors including misplacing and failure to insert terminal elements particularly in case of a multi-terminal connector which involves insertion of terminal elements of different types.

To check for incomplete terminal anchorage after insertion of a terminal element, tension is applied to the wire by moving the ensuring wire end portion, which is gripped by the wire clamp plates, backward. This helps to find defective products with an incompletely inserted terminal element immediately since such a terminal element drops off upon application of tension.

The above and other objects, features and advantages of the invention will become apparent from the following description and the appended claims, taken in conjunction with the accompanying drawings which show by way of example preferred embodiments of the invention.

DESCRIPTION OF PREFERRED EMBODIMENTS

Figure 1:
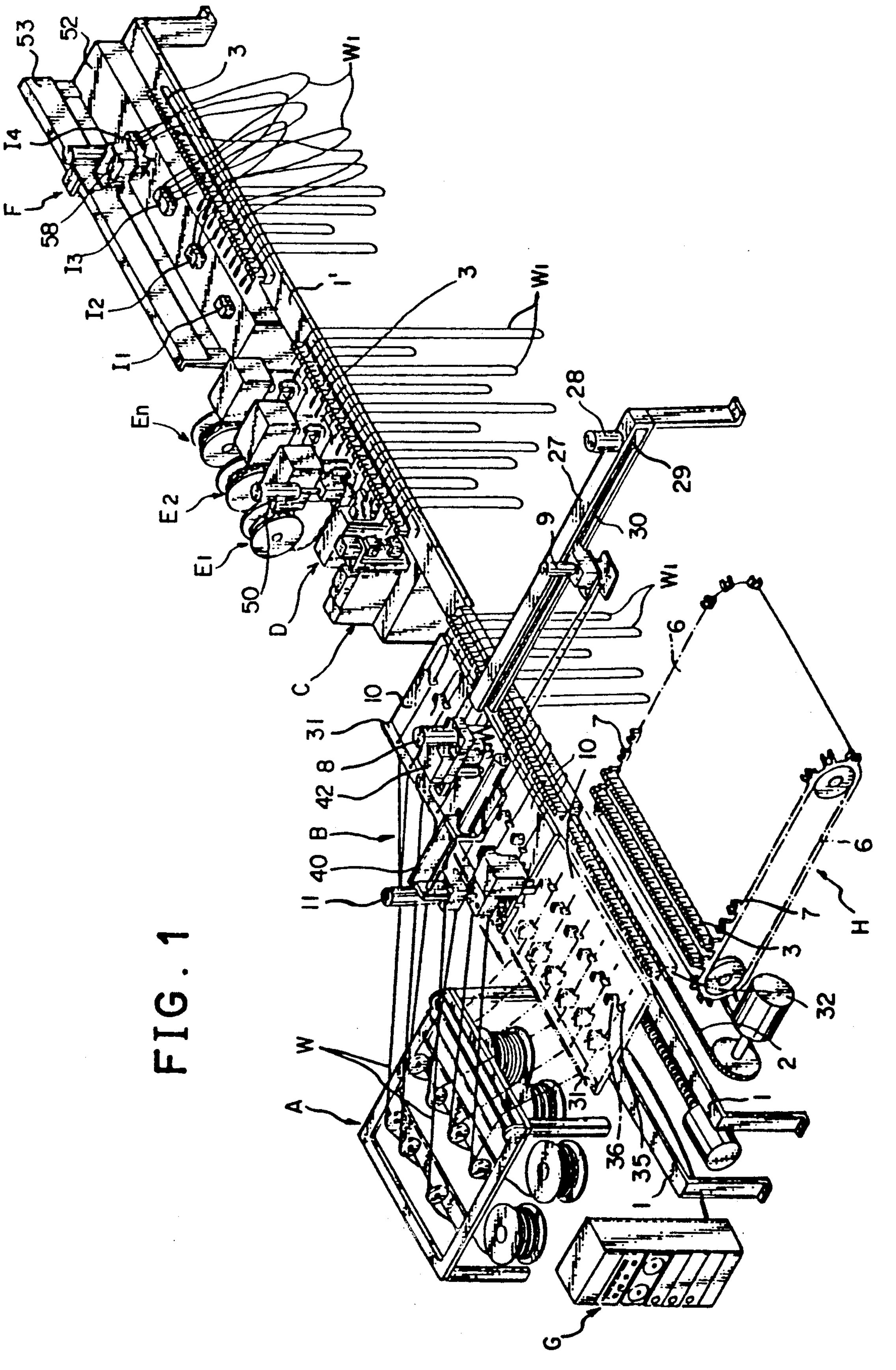
FIG. 1 is a schematic perspective view of a wire harness assembly line for automatically inserting terminal-carrying wire ends into connector housings, including a wire unitizer for forming wire units for a wire harness according to the present invention.

Hereafter, the invention is described more particularly by way of preferred embodiments shown in the drawings.

According to the present invention, the process of automatically inserting terminal-carrying wire ends consists of a) a stage of making wire units of a specific length or lengths, b) a stage of peeling the wires, c) a stage of pressing terminal elements on the wire ends (including compound wire pressing, namely, pressing on two or more wires), and d) a stage of encasing the terminal-carrying wire ends.

In FIG. 1, indicated at 1 and 1' are transfer tables which are provided with an endless chain 2 for transferring wire clamp bars 3 through the various stages as mentioned above. Located successively from the left end of the transfer table 1 are a wire unitizer B which receives elongated wires W from wire coils in a reel station A to make wire units $W_1$ of a specific length or lengths, a wire rectifying mechanism C, a wire peeling mechanism D, a plural number of terminal pressing mechanisms $E_1, E_2 \ldots E_n$, and an encasing mechanism F. Denoted at G is a control unit which operates the respective mechanisms according to programmed information. The mechanisms C, D and $E_1$ to $E_n$ may be of a known construction.

Figure 2A:
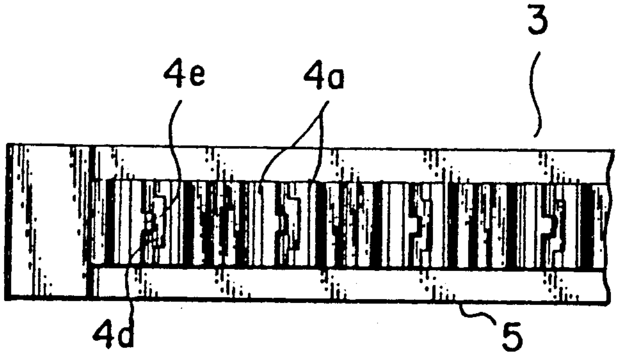
FIGS. 2A and 2B are an enlarged plan view and a side view of a wire clamp bar used in the present invention.
Figure 2B:
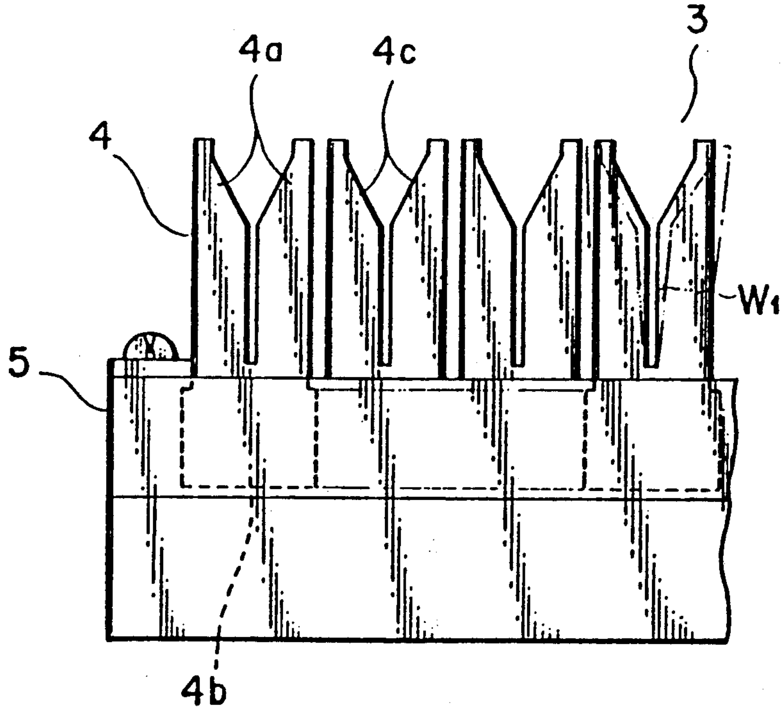

The wire clamp bars 3, which are used commonly in the respective stages are arranged to grip the opposite ends of wire units which are looped into a U-shape. As shown particularly in FIGS. 2A and 2B, each wire clamp bar 3 carries thereon a row of a large number of wire clamps 4, each consisting of a pair of clamp members 4a which have base portions 4b thereof fitted in a support frame 5 having a gutter-like shape in a sectional view. The clamp members 4a are each provided with an inclined wire guide surface 4c in a fore end portion, a recess or groove 4*d* formed on one of its opposing surfaces, and a protuberance 4*e* formed on the other surface to facilitate insertion of a wire and to grip the wire securely.

Indicated by the reference character H in FIG. 1 is a stock station for empty wire clamp bars 3 which are successively supplied toward the wire unitizer B by clamp bar holders 7 provided on a pair of endless chains 6.

The wire unitizer B, which serves to prepare wire units of a specific length, is mainly composed of a rotary head 8 for turning the wire into a U-shape, a stretching head 9, and auxiliary components including a wire anchoring plate 10 and a transfer head 11.

Figure 3A:
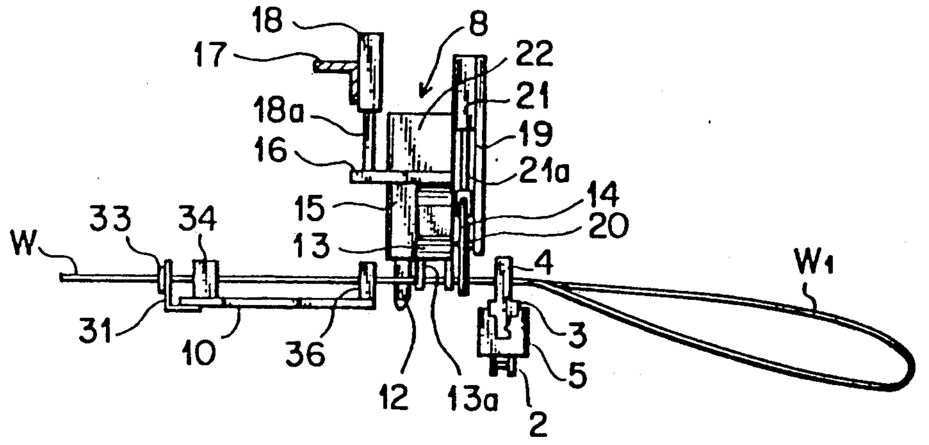
FIGS. 3A to 3F are schematic side views showing various steps for making wire units of a specific length according to the invention.

The U-turning rotary head 8 which folds the fore end of a wire into a U-shape includes, as shown in FIG. 3A, a pair of wire clamp plates 13 which are rockable toward and away from each other through 180° about a pin 12, and a pair of wire cutter members 14 of known construction. The wire clamp plates 13 are positioned forward of a rotary sleeve 15 on the pin 12, and are provided with a notched portion 13*a* as an escape for the wire clamp 4. The rotary sleeve 15 is mounted on a base plate 16 which is threadedly connected to the fore end of a piston rod 18*a* of a cylinder 18 which is fixedly mounted on a frame 17 of a support column, not shown. The wire cutter blade 14 is vertically slidably mounted, through pin 20 and guide groove (not shown), on a cutter blade support plate 19 which is pendently supported on the front side of the base plate 16. The upper end of the cutter blade is connected through a link coupling to piston rod 21*a* of a cylinder 21. Accordingly, the wire cutter blades 14 are movable up and down and in opening and closing directions independently of the wire clamp plate 13. If desired, the wire cutter blades 14 may be provided separately from the U-turning rotary head 8, for example, on the lower side of the cut wire $W_1$. The reference numeral 22 denotes a motor for stepwise rotation of the rotary sleeve 15.

Figure 3B:
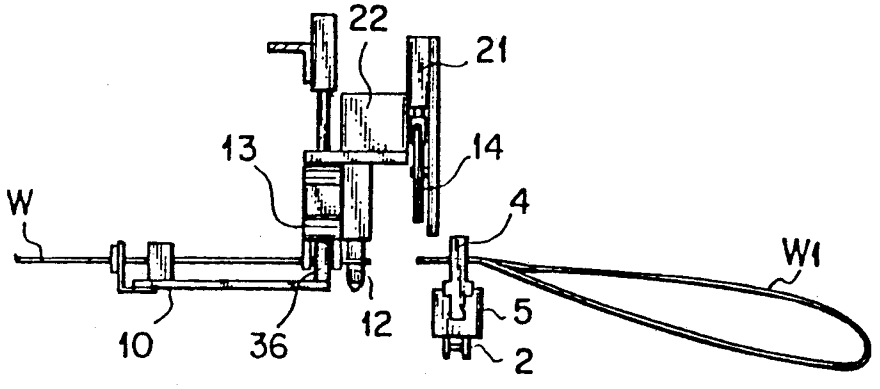
Figure 3C:
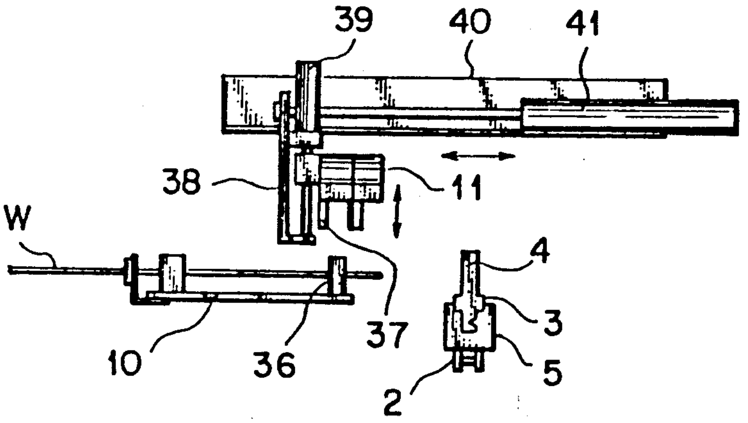
Figure 3D:
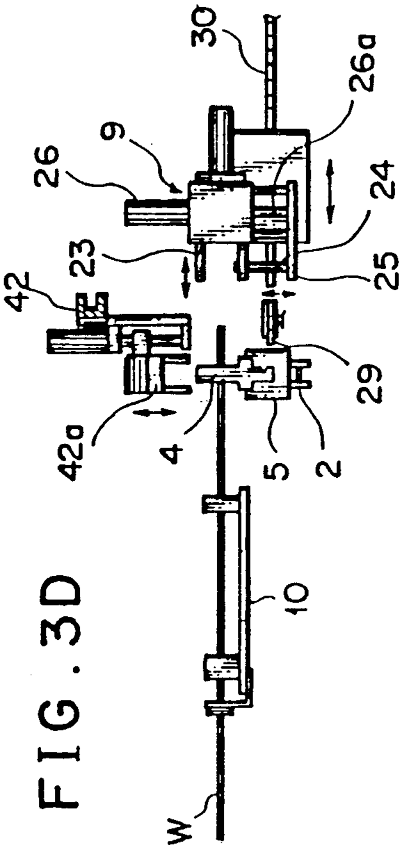

The stretching head 9 serves to stretch the wire over a length which is necessary for making a wire unit of a specified length, and, as shown in FIG. 3D, it is provided with a pair of upper and lower pin guide plates 23 which are open on the front side, and a wire hooking pin 24 which is movable up and down in bores (not shown) in the guide plates 23. The wire hooking pin 24 is supported on a base plate 25 which is threadedly connected to the lower end of piston rod 26*a* of a cylinder 26 which is fixedly mounted on the head 9. As shown particularly in FIG. 1, the stretching head 9 is supported at one end on a guide frame 27 which is positioned perpendicularly to the transfer table 1, and fixed to an endless chain 30 which is turned by a length-measuring motor 28 mounted on the frame 27 and a sprocket 29, for movement toward and away from the transfer table 1.

The temporary wire anchoring plates 10 serve to hold U-folded wires in a predetermined pitch, and include a wire distributor plate 31 which is provided with a plural number of wire feed guide rings 33, of a trumpet-like shape, in a predetermined pitch. Located forwardly, in line with the wire guide rings 33, are self-locking rolls 34 which prevent reverse wire movements and wire guide pipes 35 for passing the respective wires therethrough. A pair of wire anchor plates 36 are erected side by side with the wire guide pipe 35.

The transfer head 11 serves to transfer the wires, with the respective fore end portions folded into a U-shape, to the wire clamps 4 of the wire clamp bar 3. The transfer head 11 is provided with a pair of openable and closable wire clamp plates 37 which are similar to the wire clamp plates 13 of the U-turning rotary head 8. The transfer head 11 is connected for movement in a vertical direction by a cylinder 39 on the head holder 38, and connected for movement in a back-and forth direction by a cylinder 41 on a frame 40 which is bridged over the temporary wire anchoring plates 10. Namely, the wire clamp plates 37 are openable and closable by being movable up and down and back and forth between the wire anchor plate 36 and the clamp 4.

Figure 3E:
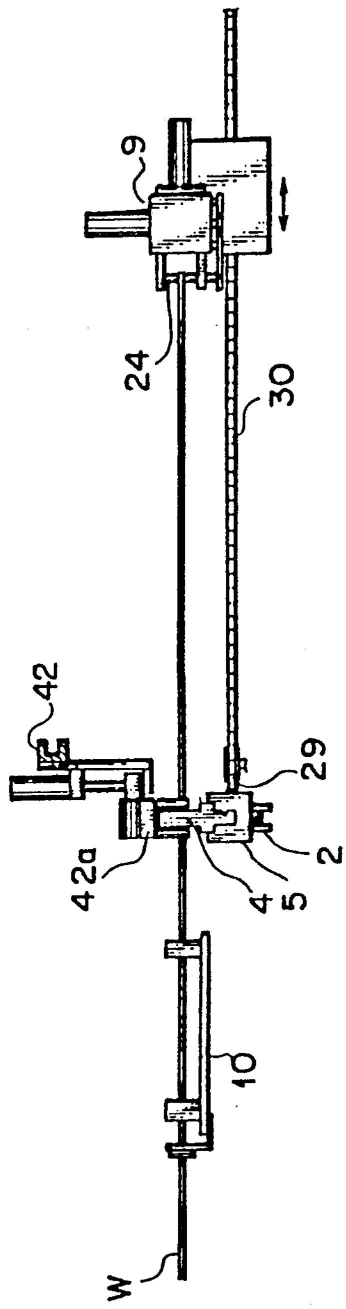

Provided side by side with the U-turning head 8 are a pair of wire fixing plates 42*a* which are movable in opening and closing directions as well as in a vertical direction relative to the wire fixing head 42. The just-mentioned wire fixing head 42 serves to grip the U-folded end portion of the wire in the wire stretching stage as will be described hereinafter (FIGS. 3D and 3E).

The wire peeling mechanism D serves to cut off and remove the insulating coatings from the wire ends to expose the conductor over a length which is necessary for pressing a terminal element thereon. This peeling mechanism D and the above-mentioned wire rectifying mechanism C may be of a conventional construction and therefore the description in this respect is omitted here.

Figure 5A:
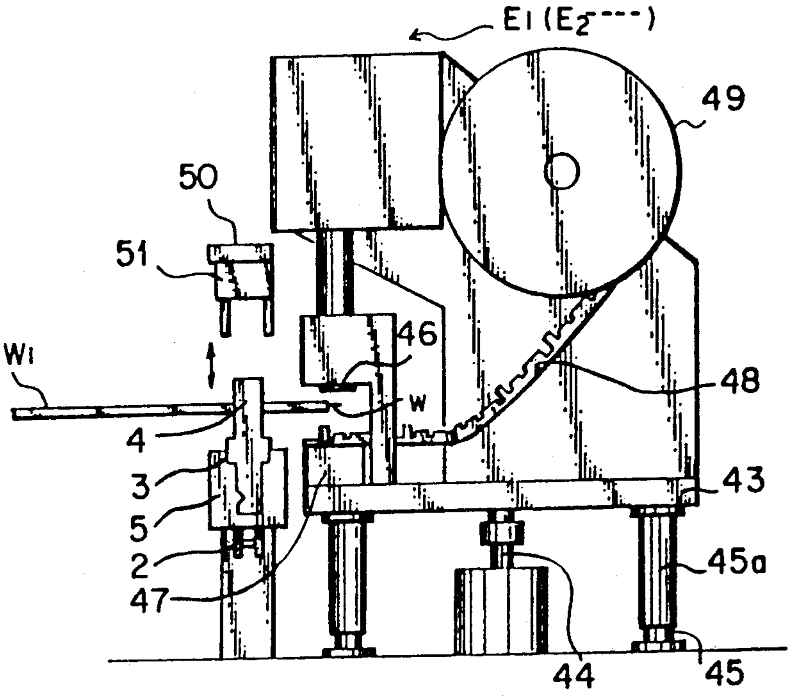
FIGS. 5A and 5B are schematic illustrations showing the method for continuously pressing on terminal elements according to the present invention.
Figure 5B:
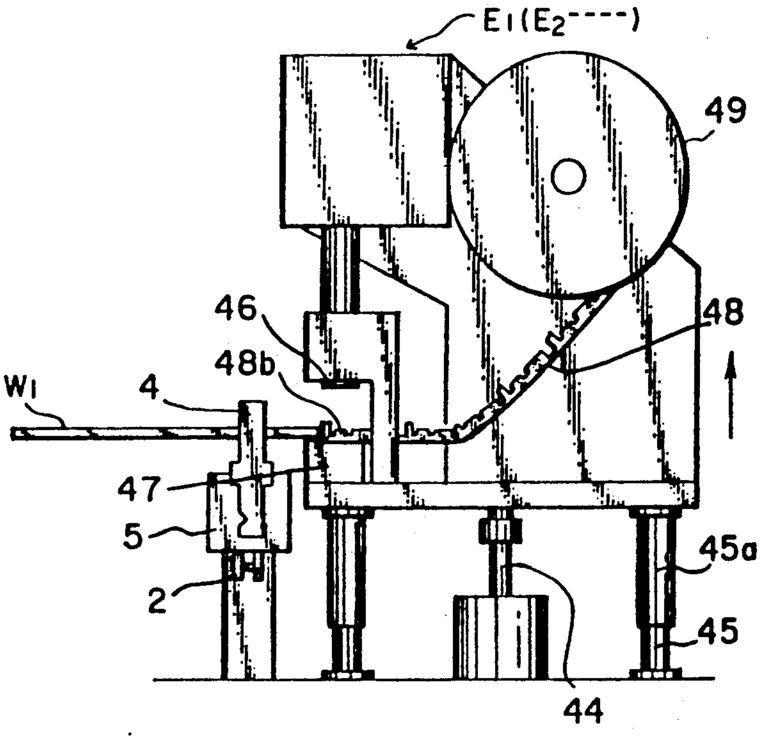

The terminal pressing mechanisms $E_1$, $E_2$ . . . $E_n$ are provided for pressing on different types of terminal elements on the wire units and each has a conventional arrangement including, as shown in FIGS. 5A and 5B, a base 43 which is movable up and down by way of a lift cylinder, a rod 45 and a guide pipe 45*a*. In FIG. 5A, the mechanism is in a lowered position with the exposed conductor portion w of a wire unit $W_1$ located between an opened ram 46 and a press bed 47. FIG. 5B shows the mechanism in an upper or lifted position with the conductor portion w placed on the press bed 47. In these figures, denoted at 48 is a chain of terminal elements, and at 49 is a terminal take-up reel. Suspendedly mounted between the terminal pressing mechanism $E_1$ and the peeling mechanism D is a compound pressing head 50 which is used for pressing a terminal element on a compound wire. The compound pressing head 50 is movable up and down and provided with a pair of clamp plates 51 of the same construction as the clamp plates 13 and 37 described hereinbefore.

The encasing mechanism F is slidably mounted on a support frame 53 which is provided along and parallel to the back side of a setting or assembling table 52 holding thereon a plural number of connector housings $I_1$, $I_2$ . . . $I_n$.

Figure 6B:
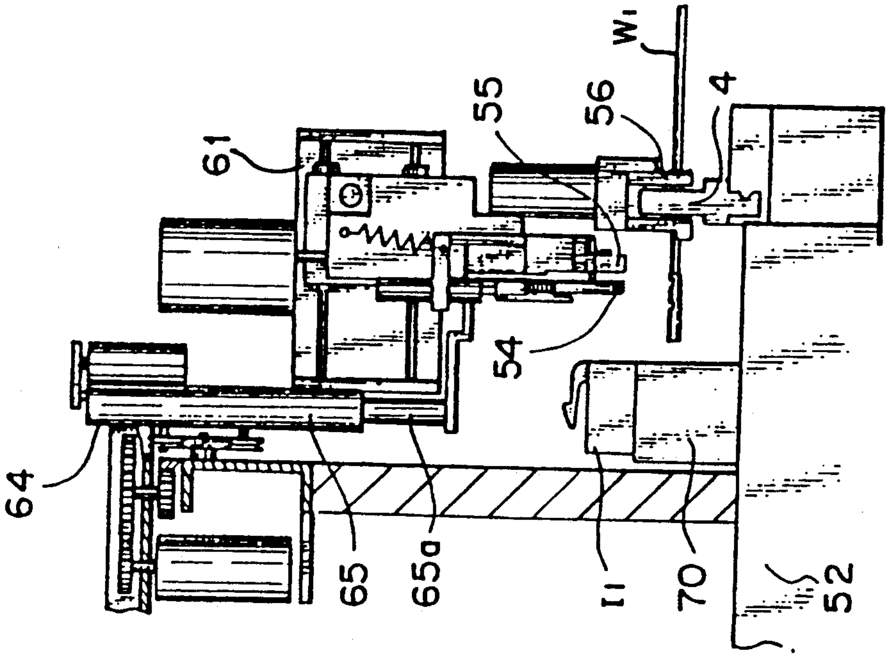
FIGS. 6A to 6G are schematic illustrations showing the steps of an encasing stage according to the invention.
Figure 6A:
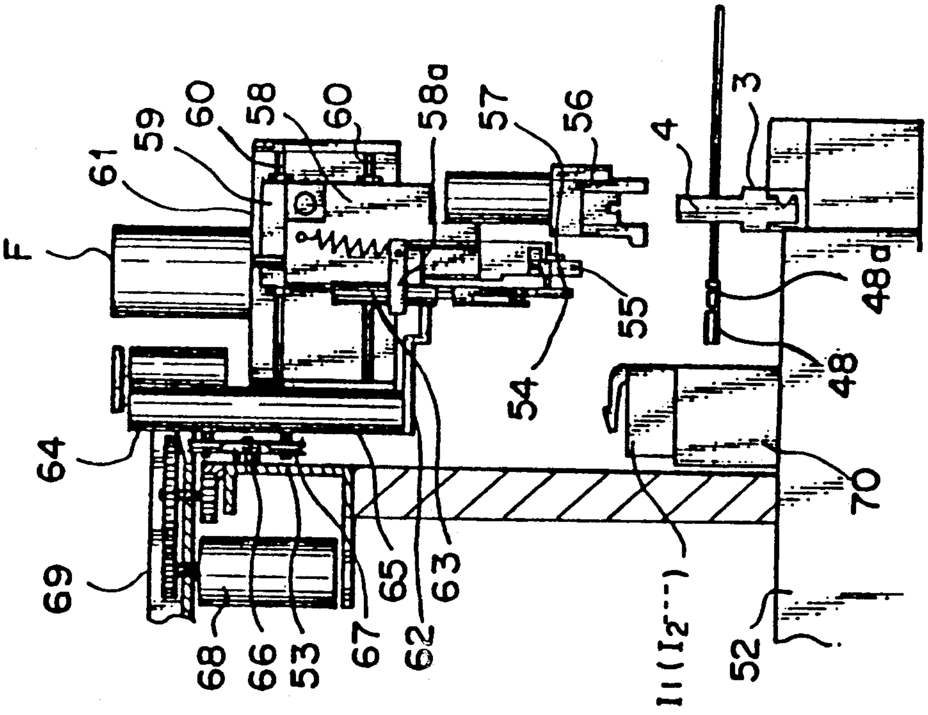
Figure 7A:
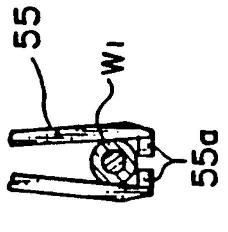
FIGS. 7A and 7B are enlarged views of a wire and a terminal element in the encasing stage.
Figure 7B:
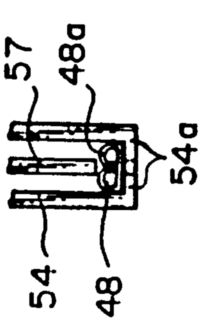

As shown particularly in FIG. 6A, the encasing mechanism F is provided with paired terminal gripping pawls 54, wire gripping pawls 55 and wire clamp plates 56. The terminal gripping pawls 54 and the wire gripping pawls 55 are formed in the shape of a hook with an L-shaped projection 54*a* or 55*a* at the respectively fore ends, as shown in FIGS. 7A and 7B. A terminal presser plate 57 is provided vertically movably between the terminal gripping pawls 54. The terminal gripping pawls 54 are arranged to grip a wire embracing neck portion 48*a* of the terminal element 48.

Indicated at 58 is an assembling head which supports thereon the above-mentioned pawls 54 and 55 and the wire clamp plates 56 and which has its head holder 59 slidably mounted on a holder support plate 61 by a couple of parallel guide rods 60 and screw rods (not shown) for movements toward and away from the connector housings $I_1 \ldots I_n$. The terminal and wire gripping pawls 54 and 55 are vertically movably supported by cylinders (not shown) on the assembling head 58. Denoted at 63 is a cylinder for lifting the terminal presser plate 57 up and down. The holder support plate 61 has its base plate portion 62 threadedly connected to a lower end portion of piston rod 65*a* of a cylinder 65 which is mounted on a transfer plate 64. The transfer plate 64 is slidably mounted on a guide rail 66 of the afore-mentioned support frame 53 through a pair of upper and lower guide rolls 67. The transfer plate 64, cylinder 65, holder support plate 61, head holder 59, and assembly head 58 are movable toward a desired one of the connector housings $I_1 \ldots I_n$ on the setting table 52 by means of a step motor 68 mounted on the support frame 53 and an endless chain 69. The reference numeral 70 indicates a locking table for the connector housings $I_1 \ldots I_n$.

As described above, the terminal gripping pawls 54, wire gripping pawls 55 and wire clamp plates 56 of the assembly head 58 are movable parallel to the array of connector housings $I_1 \ldots I_n$ using the transfer plate 64 on the support frame 53 and at the same time are movable up and down on the holder support plate 61 for movement toward and away from the connector housings $I_1 \ldots I_n$. The terminal and wire gripping pawls 54 and 55 are movable by means of cylinders (not shown) on the assembling head 58 independently of the wire clamp plates 56.

In association with the encasing mechanism F, the apparatus of the invention is further provided with a centering mechanism for aligning terminals to be inserted into a connector housing, and a check mechanism for checking the condition of inserted terminals.

Figure 8B:
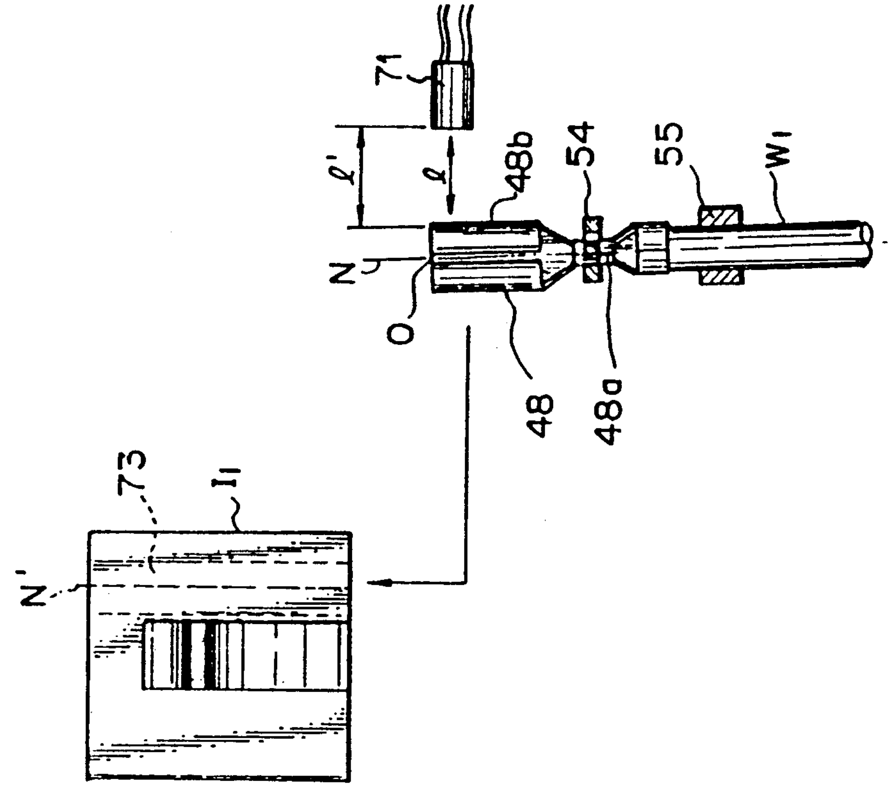
FIGS. 8A and 8B are schematic illustrations showing the operation of a terminal centering mechanism in the encasing stage.
Figure 8A:
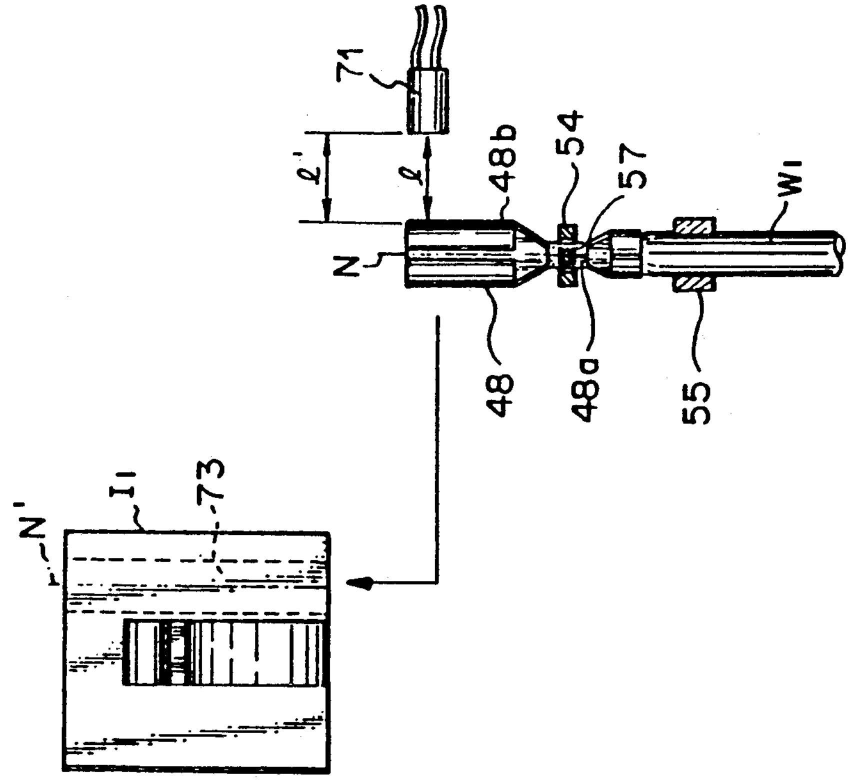

As illustrated in FIGS. 8A and 8B, the centering mechanism includes a sensor 71 which is positioned on one side of an electric contact portion 48*b* of a terminal element 48 to be contacted with a mating terminal element (not shown). More specifically, the sensor 71 is mounted on a support arm (not shown) which is extended out from the base plate 58*a* which supports the terminal and wire gripping pawls 54 and 55 on the assembling head 58. The support arm holds the sensor 71 in a position obliquely forward of the terminal gripping pawls 54. The sensor 71 measures the distance l' between the sensor 71 and the terminal 48 to check if the distance differs from a predetermined distance l.

Figure 9:
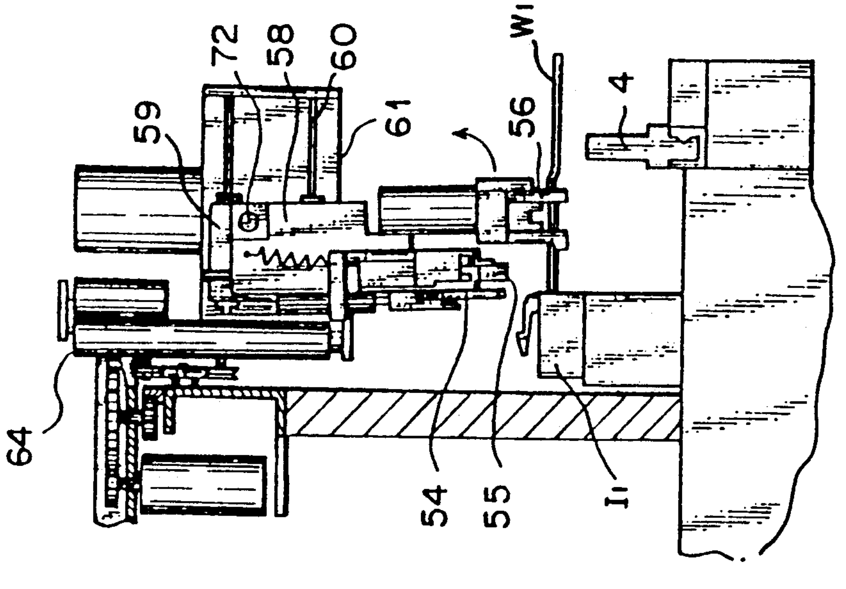
FIG. 9 is a schematic illustration of a mechanism for checking the condition of an inserted terminal element in the encasing stage.
Figure 10:
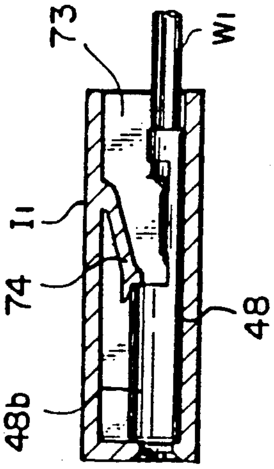
FIG. 10 is a sectional view of a terminal element inserted in a connector housing.

As shown in FIG. 9, to serve as the terminal insertion check mechanism, the assembling head 58 which supports the terminal and wire gripping pawls 54 and 55, is arranged to be rockable relative to the head holder 59 about a support shaft 72. (The arrow indicating the backward direction of rotation, i.e., away from support frame 53). Instead of the rocking motion, it is also possible to retract the head holder 59 along the guide rods 60 of the holder support plate 61. However, where the terminal elements 48 are anchored in a terminal compartment of a connector housing $I_1$ by an anchoring arm 74 as shown in FIG. 10, it is preferred to pull the terminal element 48 using the rocking motion about support shaft 72.

The operations of the mechanisms in the respective stages, from the preparation of the unit wires to encasing the terminal-carrying wire ends are as follows.

Preparation of Wire Units

As illustrated in FIGS. 3A and 3B, firstly the fore end of the elongated wire, drawn out onto the temporary wire anchoring plate 10 from the reel station A (FIG. 1), is stretched into a U-shape by the stretching head 9 through the wire guide ring 33, irreversible roll 34 and wire guide pipe 35. The wire is cut off by the wire cutter blades 14 on the U-turning rotary head 8 to form a wire unit of a predetermined length. The opposite ends of the cut-off wire unit is held in a couple of adjacent wire clamps 4 on the wire clamp bar 3 (hereinafter referred to as "a terminal point").

In this stage, the stretching length of the cut-off wire unit $W_1$ of a U-shape loop is L and its total length is 2L.

After cutting the wire into a unit length, the wire cutting blades 14 are lifted up by operating the cylinder 21, and almost simultaneously the wire clamp plates 13 are turned 180° about the pin 12 by operating the motor 22 to fold the fore end of the remaining elongated wire W into a U-shape. The folded fore end is pushed and gripped between a pair of wire anchor plates 36 which are located adjacent the wire guide pipe 35. After so gripping the wire, the temporary wire anchoring plate 10 is moved by one pitch in the direction of the arrow in FIG. 1 (i.e., by a distance between the adjacent wire clamps 4 on the wire clamp bar 3).

Figure 4A:
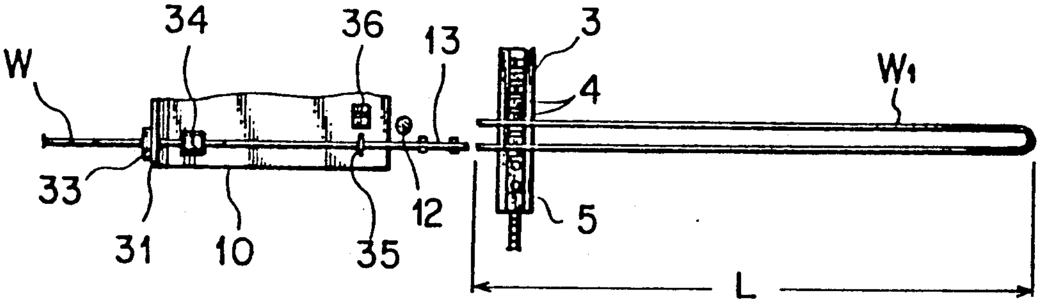
FIGS. 4A to 4E are similar schematic plan views showing the steps for making wire units of a specific length.
Figure 4B:
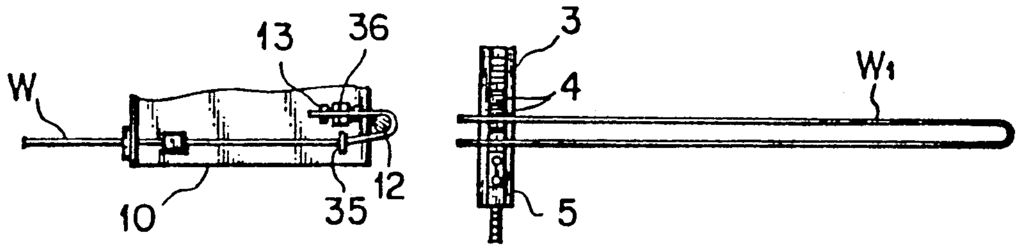

In this manner, after making a wire unit $W_1$ of a predetermined length by stretching and cutting the wire, the fore end of the remaining elongated wire W is folded into a U-shape and is held in a stand-by state for the next wire stretching and wire cutting operation. In FIG. 1, the temporary wire anchoring plates 10 (FIG. 4B) are indicated by a two-dot chain line. The plates 10 retain the U-folded fore ends of a plural number of elongated wires W in stand-by positions by means of the wire guide pipes 35 and wire anchor plates 36 (hereinafter referred to as "an initial point").

Figure 4C:
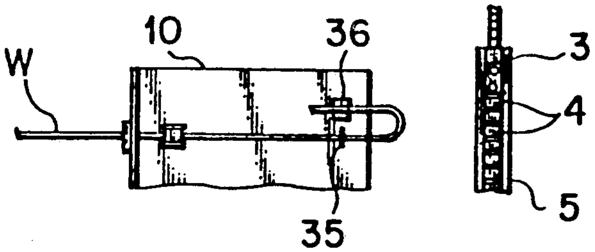

FIGS. 3C and 4C show the initial state of the wire stretching stage. In this state, the transfer head 11 is moved in the arrowed direction to a position over the wire anchor plate 36 by operation of the cylinder 41. Then, a pair of wire clamp plates 37 are lowered to grip a U-folded fore end portion (i.e. closed position) and an opposing portion of the elongated wire W, and, after they are lifted up and receded by an inverse operation (i.e. opened position), the wire is transferred to and gripped in the wire clamp 4 (FIG. 4D).

Figure 4D:
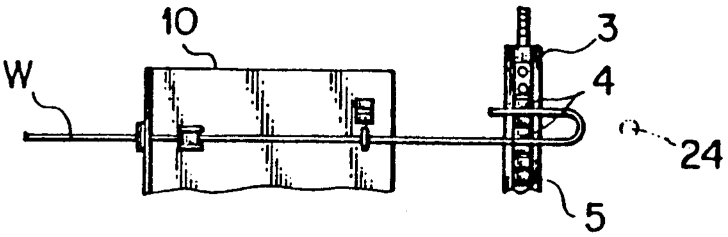

Next, as shown in FIGS. 3D and 4D, the wire fixing plate 42*a* of the wire fixing head 42 is lowered to fixedly grip the U-folded end portion in the wire clamp 4. Simultaneously, the stretching head 9 is moved toward the U-folded end portion by rotation of the length-measuring motor 28 (FIG. 1). At this time, the wire hooking pin 24 is in the lowered position, and the front side of the upper and lower guide plates 23 is in an open state to receive the U-folded fore end portion between the guide plates 23. The front side of the guide plates 23 is then closed by moving the wire hooker pin 24 upward by operating the cylinder 26.

Figure 4E:
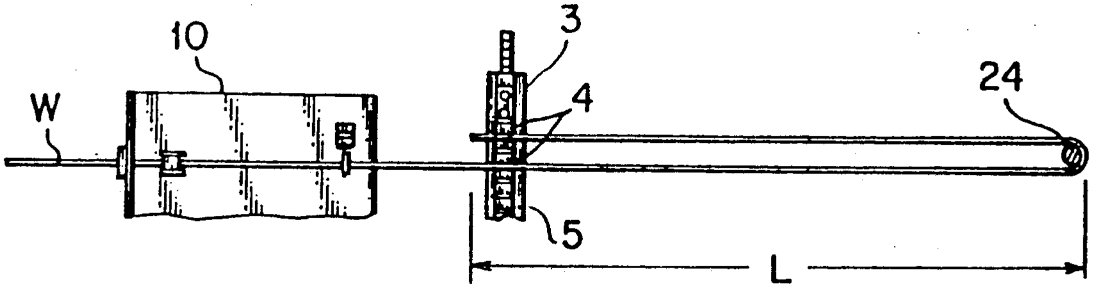

Next, as shown in FIGS. 3E and 4E, the stretching head 9 is moved backward over a distance (L), half the required wire unit length by an operation inverse to the above-described advancing operation. The wire hooker pin 24 is then lowered to disengage from the wire, and the wire fixing plate 42 is moved upward to be restored to its initial position.

Figure 3F:
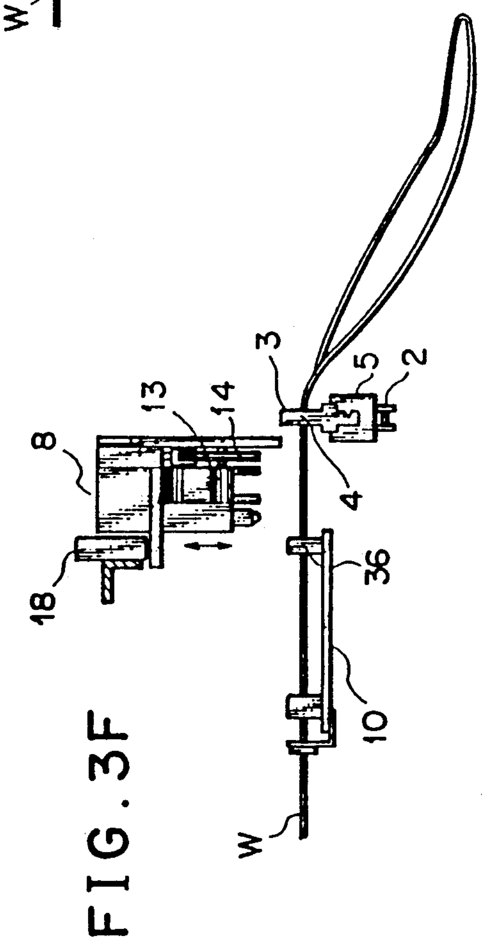

Finally, as shown particularly in FIG. 3F, the U-turning head 8 is lowered onto the U-turned elongated wire W by operating the cylinder 18. After gripping the wire with the wire clamp plates 13, the wire is cut by the wire cutter blades 14, and the head 8 is returned to the "terminal point" as shown in FIG. 3A. Thereafter, the elongated wires W are successively formed with the U-shape folded portion, transferred to the position indicated by two-dot chain line in FIG. 1, and gripped on a freshly supplied wire clamp bar 3.

The foregoing operations result in desired wire units $W_1$ having a length of substantially 2L.

Figure 11A:
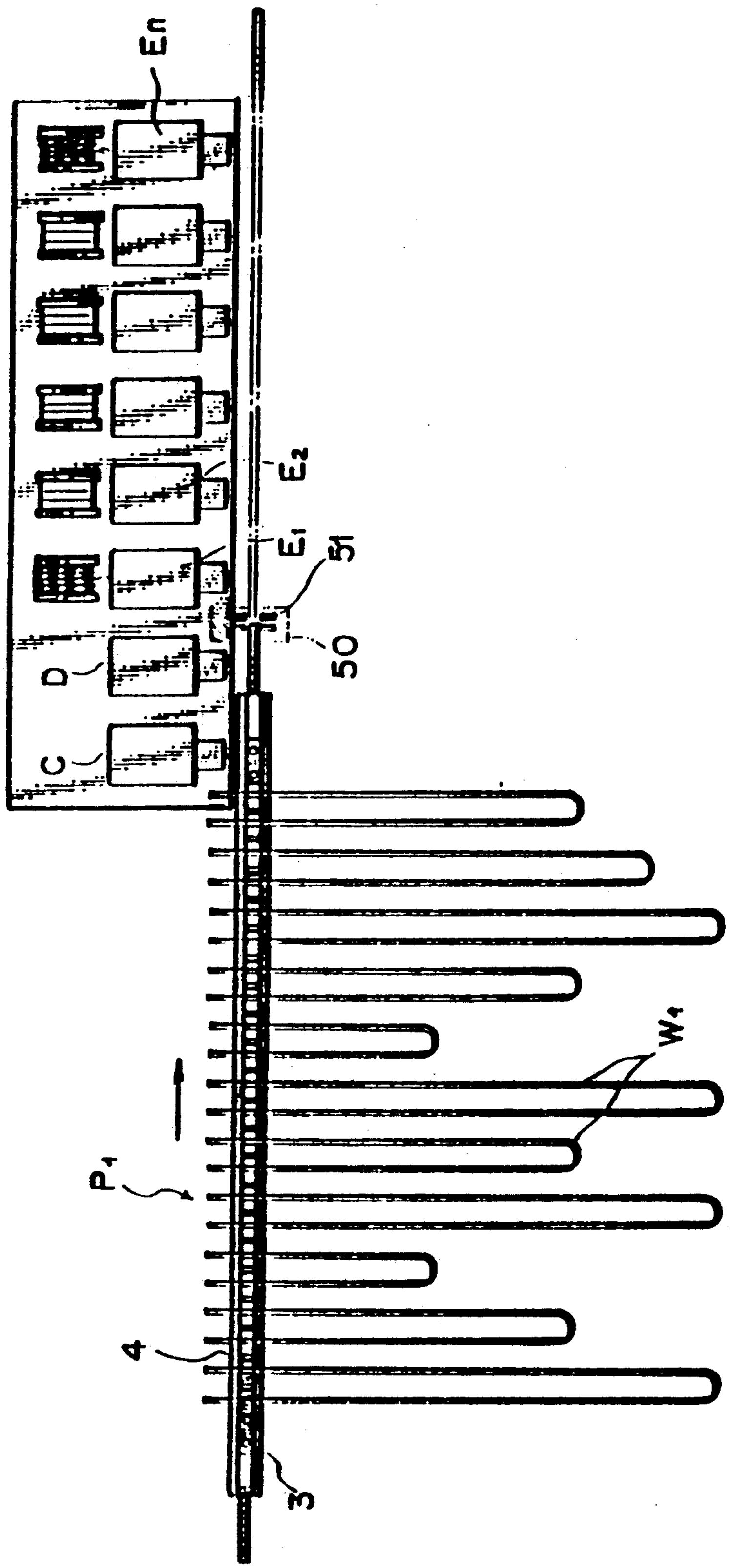
FIGS. 11A to 11D are schematic illustrations showing the steps in the stages of rectifying wire units, wire peeling and terminal pressing.

Thus, by repeating the operations from the "initial point" to the "terminal point" shown in FIGS. 3A to 3E and FIGS. 4A to 4E, there is obtained a primary intermediate product $P_1$ (as shown in FIG. 11A) of a wire harness, consisting of a plural number of wire units $W_1$ of the same or different lengths having the respective opposite ends securely gripped in the wire clamps 4 of a wire clamp bar 3.

In the above-described stage of preparing wire units of a specific length or lengths, the wire clamp bar 3 with an array of wire clamps 4 may be replaced by wire grippers as disclosed in Japanese Patent Publication No. 62-12604. Namely, wire grippers are provided on an endless chain in a predetermined pitch, each consisting of a pair of openable and closable gripper members. It is also possible to perform the operation of folding the fore end portions of elongated wires $W_1$, into a U-shape and the wire stretching and cutting operations independently at separate positions. Also the wire transfer head 11 may be dispensed with, omitting the operation of transferring the U-shape folded portion from the temporary wire retaining plate 10 to the wire clamp bar.

Wire Peeling & Rectifying Stage

The primary intermediate product $P_1$ (see FIG. 11A) is transferred stepwise on and along the transfer tables 1' in the arrowed direction by one pitch in each step. After removing bends and irregularities in end portions of the wire through the wire rectifying mechanism C, the insulating coating is peeled off from end portions of the wire by the peeling mechanism D of a conventional construction.

Terminal Pressing Stage

As described above with reference to FIGS. 5A and 5B, the terminal pressing mechanisms $E_1, E_2 \ldots E_n$ of FIG. 1 are all in a lowered position with the respective ram 46 and press block 47 in an opened state. The end portions of a plural number of wire units $W_1$ of a predetermined length, which are fixedly held on a wire clamp bar 3, are fed through this open space intermittently one pitch at a time. The terminal pressing mechanisms E1 . . . En are provided with chained terminal elements 48 of different sizes and shapes.

Figure 11B:
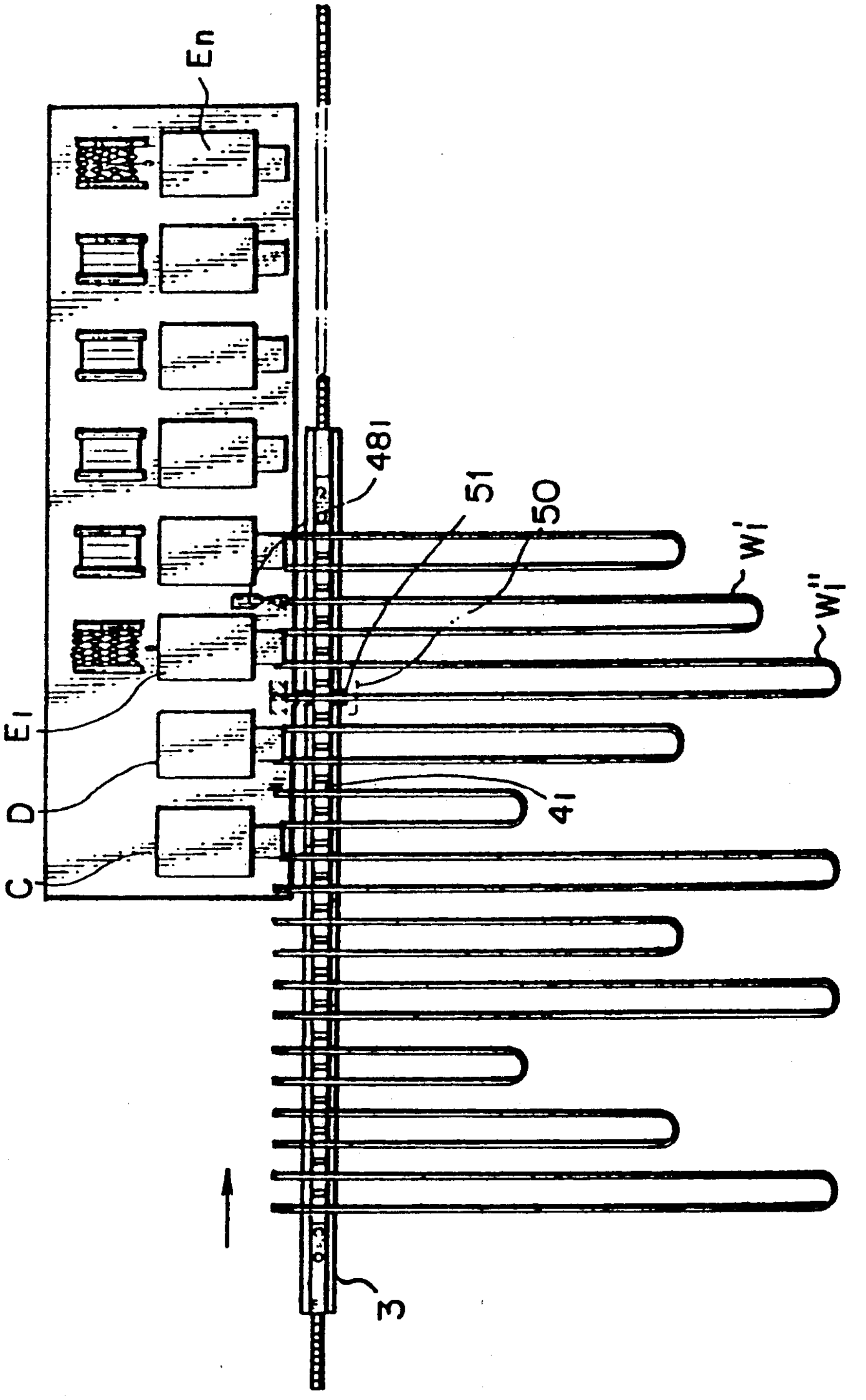
Figure 11C:
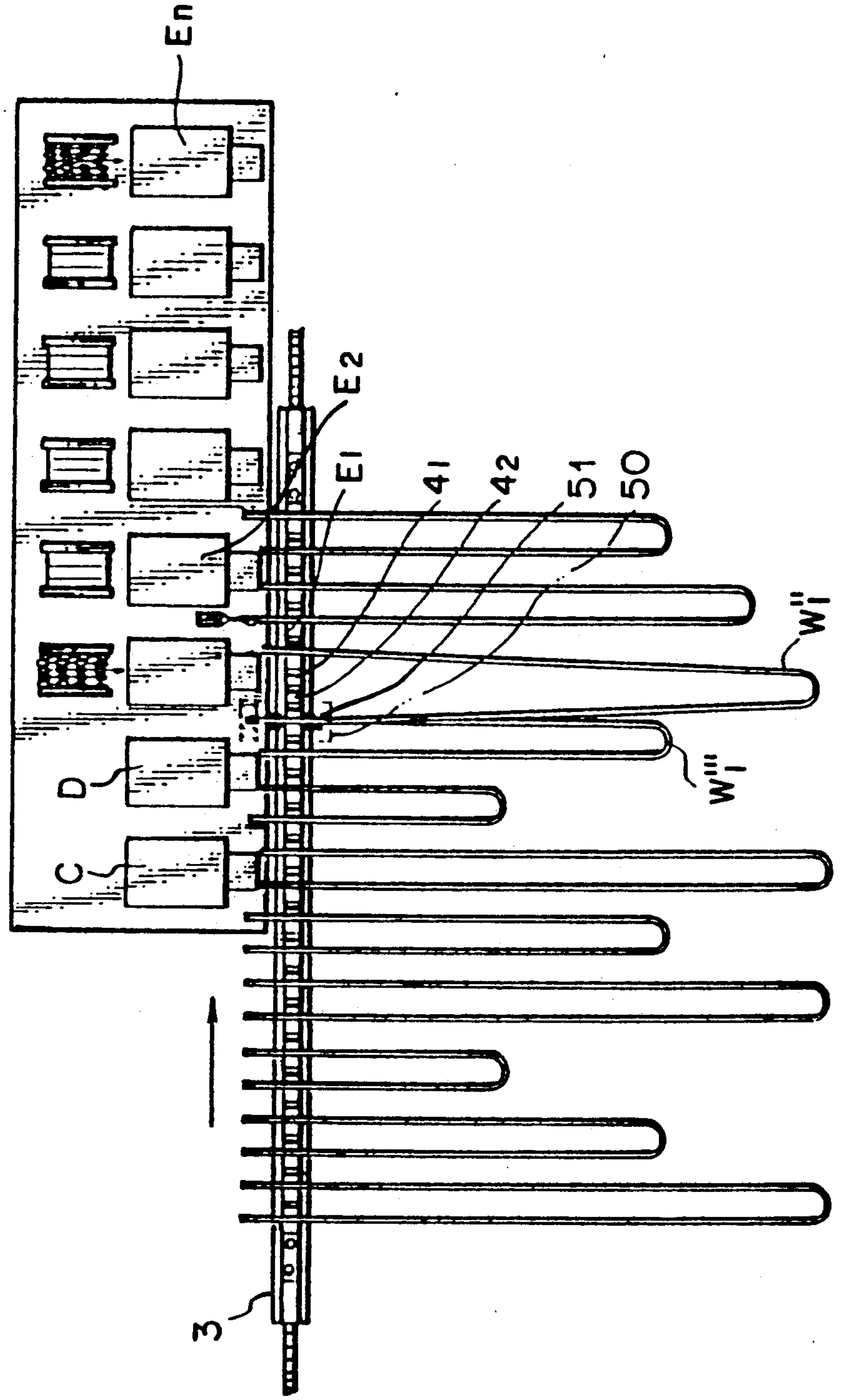

Accordingly, during intermittent feeding of the wire clamp bar 3, terminals of a desired type or types are successively pressed on the end portions of the wire units $W_1$ by selected pressing mechanisms $E_1 \ldots E_n$. FIGS. 11B and 11C show a terminal element 48, which has been pressed on an end portion of a wire unit $W_1'$ by the terminal pressing mechanism $E_1$. For pressing on a terminal element, the mechanism $E_1$ is lifted up by the cylinder 44 as shown in FIGS. 5A and 5B. Then, a wire embracing portion of the terminal 48 is placed on the press bed 47, and the ram 46 is lowered by the known mechanism. After pressing, the mechanism $E_1$ is lowered by an inverse operation to return to the position of FIG. 5A.

The terminal elements can be continuously pressed on by having either the wire clamp bar 3 or the group of terminal pressing mechanism $E_1$ to $E_n$ being movable toward and away from the other.

Compound Pressing Stage

The stage of compound pressing, by which a terminal element is pressed on two or more wires, may proceed concurrently with the above-described singular pressing. More specifically, as shown in FIG. 11B, a vertically movable compounding head 50 is located between the peeling mechanism D and the pressing mechanism $E_1$, with its wire clamp plates 51 immediately above a wire clamp which is indicated by a reference numeral $4_1$. In operation, the clamp plates 51 are lowered and lifted again after gripping an end portion of the wire unit $W_1''$, and then the wire clamp bar 3 is shifted by one pitch and the wire clamp plates are lowered and lifted again by an inverse operation to grip the wire end in an adjacent wire clamp $4_2$ in an overlapped state on another wire unit $W_1'''$ as shown in FIG. 11C.

Figure 12:
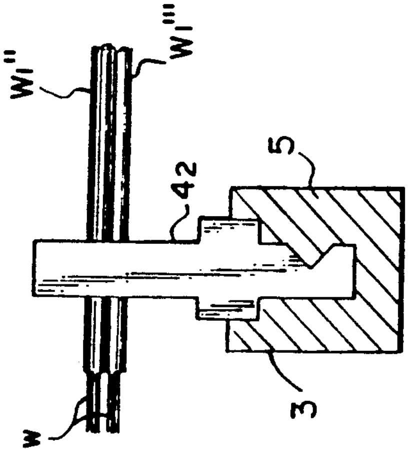
FIG. 12 is a schematic side view of a wire clamp holding a couple of wire units of a specific length together for compound pressing.

FIG. 12 illustrates the wire units $W_1''$ and $W_1'''$ gripped in a compounded state in the wire clamp $4_2$. As soon as the wire clamp $4_2$ reaches a desired one of the pressing mechanisms $E_1$ to $E_n$ by intermittent movement of the wire clamp bar 3, a terminal element is pressed on the compounded wire in the same manner as in the singular pressing described hereinbefore.

For the compound pressing, desired ones of the wire units $W_1$ can be gripped in a compounded state (FIG. 12) more easily and in a diversified manner by making the compounding head 50 move parallel with the wire clamp bar 3.

Figure 11D:
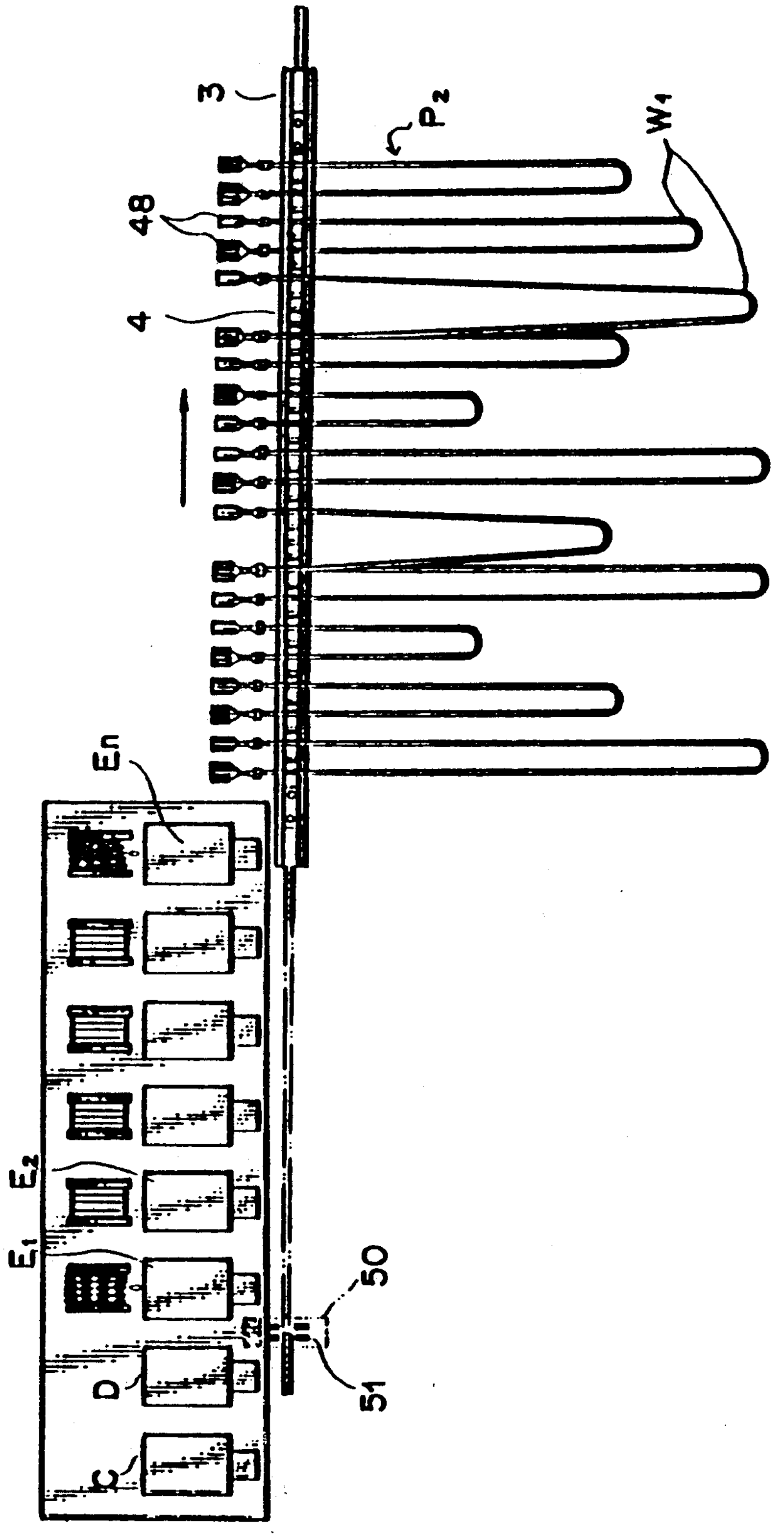

Consequently, as shown in FIG. 11D, a secondary intermediate product $P_2$ of a wire harness is obtained, holding opposite end portions of a plural number of terminal-carrying wires (wire units) $W_1$ including compounded wires in the wire clamps 4 of the wire clamp bar 3.

Encasing Stage

As shown in FIG. 1, all of the thus-obtained secondary intermediate products $P_2$ (shown in FIG. 11D) are sent onto the assembling table 52 which holds thereon an array of connector housings $I_1$ to $I_4$.

Firstly, as shown in FIG. 6A, the transfer plate 64 is moved along the guide rail 66 to a position over a desired wire clamp 4 by operation of the step motor 68.

Next, the holder support plate 61, namely, the wire clamp plates 56 are lowered by operation of the cylinder 65 to grip a wire unit $W_1$ (FIG. 6B). Then the terminal gripping pawls 54 wire gripping pawls and 55, respectively are lowered to grip the wire embracing portion 48a of the terminal element and a wire portion respectively from opposite sides (FIG. 6C).

At this time, as shown in FIGS. 7A and 7B, the terminal presser plate 57, located between the terminal gripping pawls 54, is lowered by operation of the lift cylinder 63 to push down the terminal element 48 and adjust the terminal element 48 into a substantially horizontal predetermined posture in cooperation with the projections 54a and 55a.

Figure 6D:
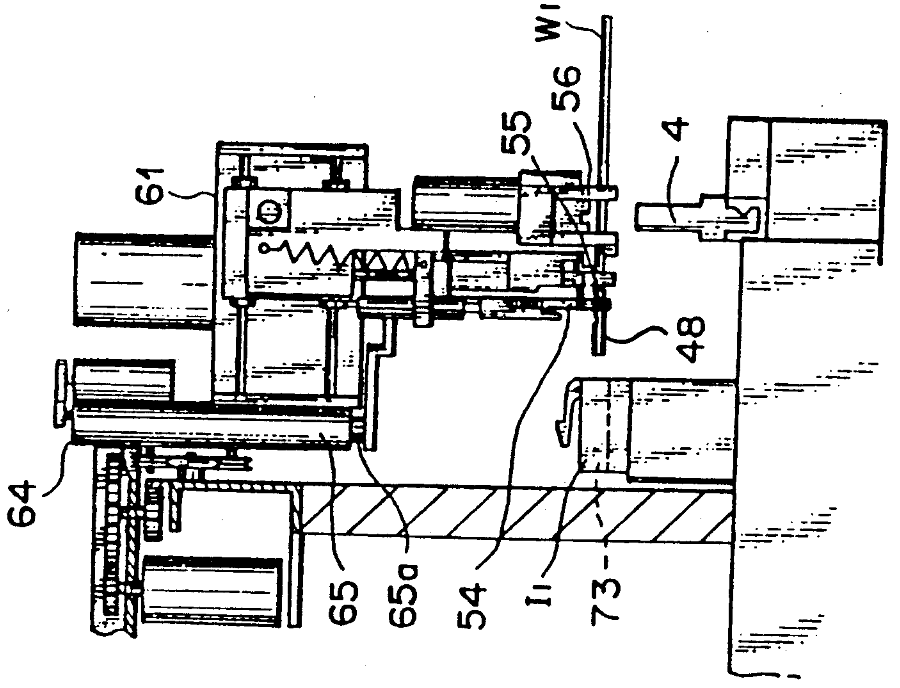
Figure 6C:
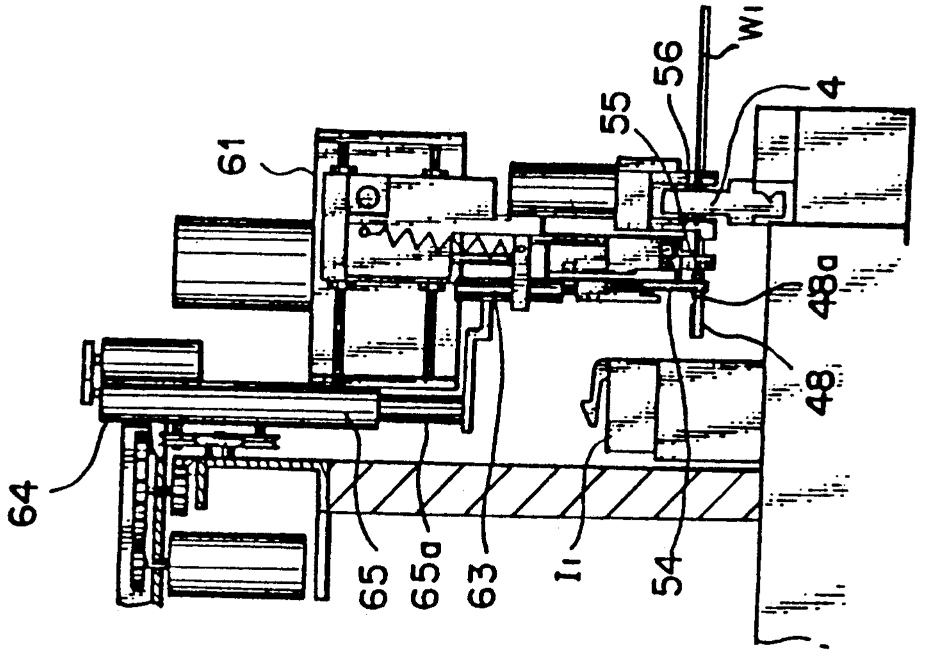

Succeedingly, the terminal gripping pawls 54 and the wire clamp plates 56 are lifted up by an inverse operation to remove the wire $W_1$ from the wire clamp 4 (FIG. 6D). If necessary, the transfer plate 64 is moved in a lateral direction, in the same manner as described hereinbefore, to bring the fore end portion of the terminal element 48 into a position confronting a terminal compartment 73 (FIG. 10) of a selected one of the connector housings $I_1$ to $I_4$.

Figure 6G:
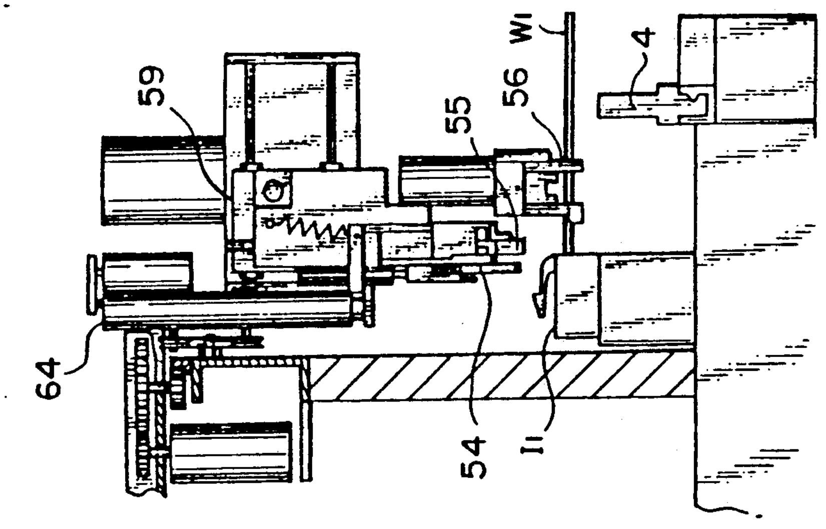
Figure 6F:
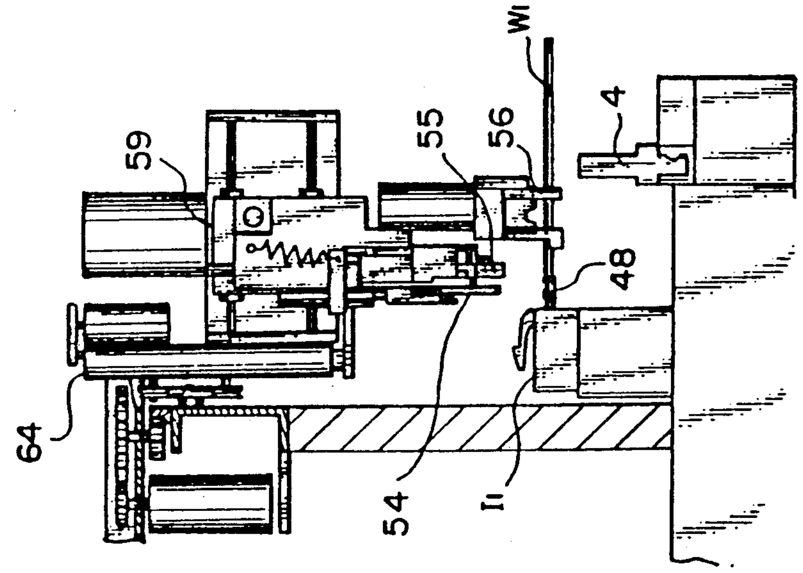
Figure 6E:
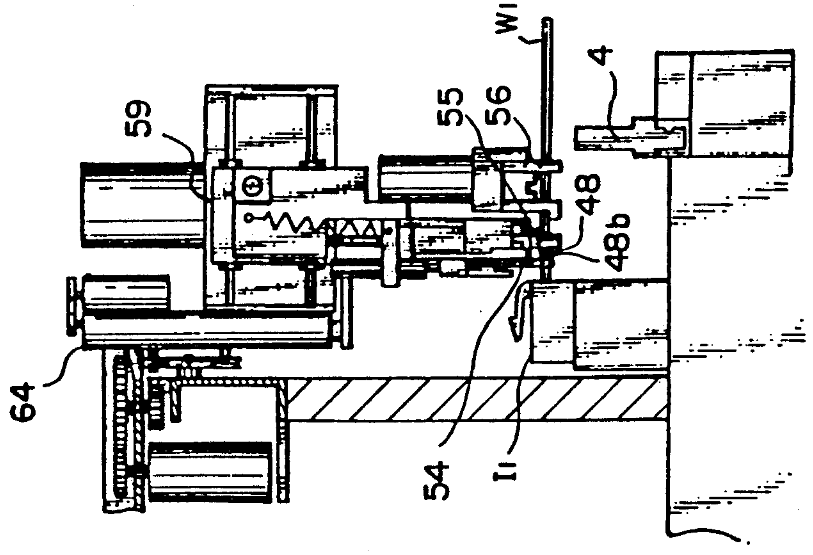

Next, as shown in FIGS. 6E and 6F, the head holder 59 is advanced toward the connector housing to insert the electric contact portion 48*a* of the terminal 48 into the terminal compartment 73 (FIG. 6E), whereupon the terminal and wire gripping pawls 54 and 55 are opened and lifted up into upper positions (FIG. 6F).

Next, as shown in FIG. 6G, the head holder 59 is advanced further together with the wire $W_1$ which is gripped by the wire clamp plates 56. The terminal element 48 is thus inserted into the terminal compartment 73 as shown in FIG. 10. As a result, the terminal element 48 is locked in position by engagement with the anchoring arm 74.

By repeating the foregoing operations, the terminals on desired wire units $W_1$ are inserted into predetermined terminal compartments 73 of a selected one of connector housings $I_1$ to $I_4$.

Even where a plural number of connector housings are arrayed on stepped surfaces, the terminal elements can be encased in a similar manner by upward and downward movements of the assembling head 58.

Terminal Centering Mechanism

When inserting a terminal 48 into a terminal compartment 73 as shown in FIGS. 6D and 6E, their axial center lines N and N' should be parallel with each other as shown in FIG. 8A because smooth insertion becomes difficult if the axial center line N of the terminal element 48 is inclined as shown in FIG. 8B.

In this regard, in the present invention, a sensor 71 is provided to detect if there is a deviational error in the distance l' between the sensor 71 and a fore end portion of the terminal element 48 from a predetermined value l. If not, the transfer plate 64 is shifted by the distance l, and, if there is an error ($\pm\Delta l$), the transfer plate 64 is shifted by l $\pm\Delta$ to correct the error.

The value l is determined depending upon the shape and size of the terminal element 48. The values for the respective types of the inserting terminal elements are stored in the control unit C beforehand as pre-operational input data. The sensor 71 is of a conventional type consisting of, for example, a light-emitting element like a phototransistor and a light-receiving element. Alternatively, there may be used a sensor which is compares reflection angles instead of the distances l and l'.

For centering the terminal element 48, the axial center lines N and N' need not be exactly parallel with each other. That is to say, the insertion is possible if the center O of the fore end of the terminal element 48 is in alignment with the axial center line N' of the terminal compartment 73.

Terminal Insertion Check Mechanism

The encasing operation ends with the insertion of the terminal element 48 shown in FIG. 6G. However, it is desirable to check if the terminal elements 48 have been completely inserted.

For this purpose, the assembling head 58 is swung back above the support shaft 72 as indicated by an arrow in FIG. 9, thereby applying a predetermined tension to the wire unit $W_1$ to check for incomplete insertion if any. Instead of the back swing of the assembling head 58, the wire clamps 56, namely, the head holder 59 may be moved backward along guide rods 60 for this purpose.

Figure 14:
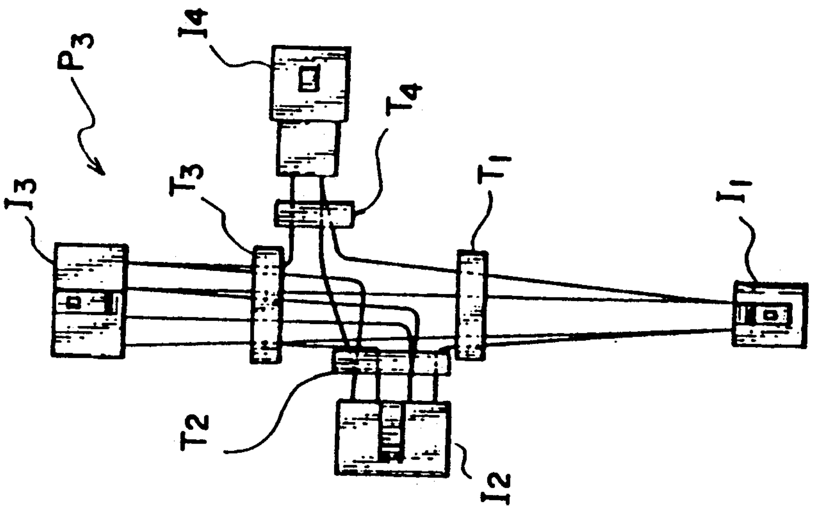
FIGS. 13 and 14 are schematic illustrations showing an operation for forming a wire harness from the encased wire units having the respective terminal elements anchored selectively in a number of connector housings.
Figure 13:
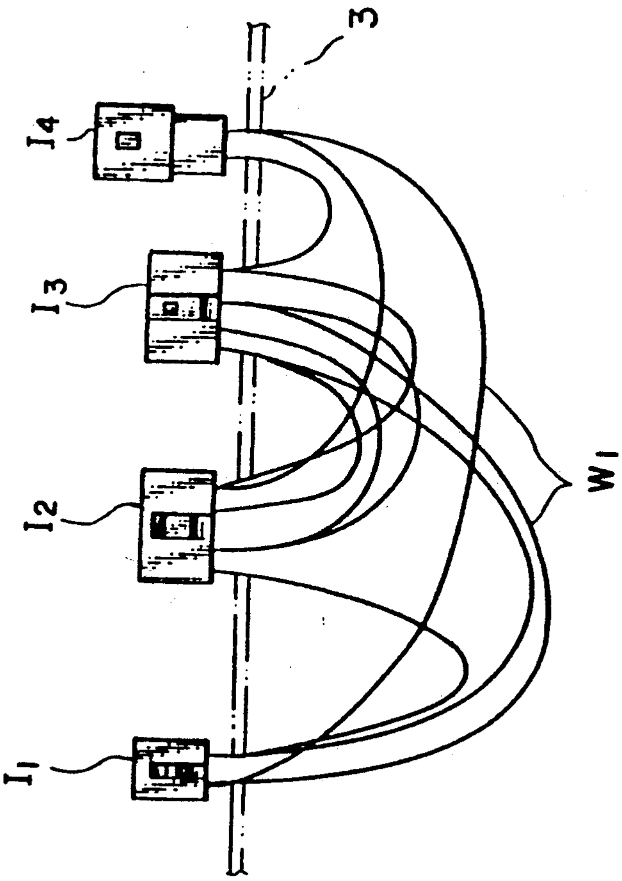

FIG. 13 shows a group of encased wire units $W_1$ which have been removed from the wire clamp bar 3. A final product $P_3$, in the form of a wire harness as shown in FIG. 14, is obtained by applying bundling tapes $T_1$, $T_2$, $T_3$... around the wire units at intermediate portions between the connector housings $I_1$ to $I_4$.

It will be appreciated from the foregoing description that, according to the present invention, the terminal-carrying ends of wire units can be inserted into connector housings in a securely anchored state by the use of a single automated apparatus, almost irrespective of the type of terminal elements and without using auxiliary jigs such as terminal insertion guides. At the end of the encasing stage, the apparatus permits a product to be obtained which is close to the final product a wire harness by suitably positioning a plural number of connector housings in relation with the terminal-carrying wire units.

In addition, in the stage of inserting the terminal-carrying ends of wire units into a connector housing, a check is made to find incompletely anchored terminal elements, thereby precluding the occurrence of defective products.

What is claimed is:

1. A method of inserting a terminal element, attached at an end of a wire, into a connector housing, said method comprising the steps of:

(a) arranging a plurality of wire end portions substantially in parallel to each other such that wire ends thereof are aligned in a predetermined direction, each wire end being attached with a terminal element;

(b) gripping the terminal element of one of said wire end portions by means of terminal gripping pawls while gripping said one of the wire end portions by means of wire gripping pawls;

(c) lowering a terminal presser plate between said terminal gripping pawls to adjust said terminal into a substantially horizontal posture in cooperation with said terminal gripping pawls;

(d) positioning said wire end opposite to a connector housing using said terminal gripping pawls and said wire gripping pawls; and (e) inserting said wire end into said connector housing using the terminal gripping pawls and the wire gripping pawls.

2. A method according to claim 1, wherein said step (a) includes the step of:

(f) overlapping some of said wire end portions.

3. A method according to claim 1, wherein said step (a) includes the step of:

(g) gripping said wire end portions by means of plural pairs of wire clamps mounted with predetermined intervals therebetween on a wire clamp bar.

4. A method according to claim 1, further including the steps of:

(h) gripping said one of the wire end portions by means of wire clamp plates between the steps (a) and (b) and (i) moving said wire clamp plates toward said connector housing to lock said terminal element within said connector housing subsequent to the step (e).

5. A method according to claim 4, further including the steps of:

(j) opening the terminal gripping pawls and the wire gripping pawls to release the wire end portions, and (k) moving said wire clamp plates away from said connector housing to apply a predetermined tension to said wire end portions such that locking of said terminal element within the connector housing is checked.

6. A method according to claim 5, wherein said step (k) is performed by horizontal translation of said wire clamp plates.

7. A method according to claim 5, wherein said step (k) is performed by swing motion of said wire clamp plates.

8. A method according to claim 1, further including the step of:

(l) detecting an error in the positioning of said terminal element to perform a centering of said terminal element subsequent to the step (d).

9. An apparatus for inserting a terminal element attached at an end of a wire into a connector housing, said apparatus comprising:

an assembling head provided in front of a plurality of connector housings;

means for moving toward said assembling head a plurality of wire end portions of at least a length of wire arranged in parallel to each other such that wire ends thereof are aligned in a predetermined direction, each wire end being attached with a terminal element;

a pair of terminal gripping pawls and a pair of wire gripping pawls mounted on an underside of said assembling head and vertically movable relative to said assembling head; and a terminal presser plate vertically movable between said pair of terminal gripping pawls;

said assembling head movable in vertical directions as well as in directions toward and away from said connector housings.

10. An apparatus according to claim 9, further including a transfer plate integrally provided with said assembling head and movable toward a desired one of the connector housings.

11. An apparatus according to claim 9, further including wire clamp plates mounted on said assembling head at an underside thereof to grip said wire end portion, and said wire clamp plates to move the wire end portion toward the connector housing until said terminal element is locked within the connector housing and said wire clamp plates to move away from the connector housing such that locking of said terminal element within the connector housing is checked.

12. An apparatus according to claim 9, further including a sensor in a position proximate to said terminal gripping pawls, said sensor to detect an error in positioning of said terminal element to perform a centering of said terminal element.

13. An apparatus according to claim 11, wherein said assembling head is for horizontal translation to perform said movement in the direction away from the connector housing.

14. An apparatus according to claim 11, wherein said assembling head is for swing action to perform said movement in the direction away from the connector housing.

* * * * *